United States Patent [19]

Javan

[11] Patent Number: 4,774,714
[45] Date of Patent: Sep. 27, 1988

[54] LASER SYSTEM WITH INTERCHANGEABLE MODULES AND METHOD FOR INTERCHANGING SUCH MODULES

[75] Inventor: Ali Javan, Cambridge, Mass.

[73] Assignee: Laser Science, Inc., Cambridge, Mass.

[21] Appl. No.: 803,663

[22] Filed: Dec. 2, 1985

Related U.S. Application Data

[63] Continuation-in-part of Ser. No. 496,069, May 19, 1983, abandoned, which is a continuation-in-part of Ser. No. 351,424, Feb. 2, 1982, abandoned.

[51] Int. Cl.$^4$ .............................................. H91S 3/00
[52] U.S. Cl. ..................................... 372/109; 372/65; 372/87; 372/107
[58] Field of Search .................... 372/87, 109, 107, 65

[56] References Cited

U.S. PATENT DOCUMENTS

| | | | |
|---|---|---|---|
| 3,400,596 | 9/1968 | Laich | 372/107 |
| 3,553,604 | 1/1971 | Andress et al. | 372/107 |
| 3,805,015 | 4/1974 | Herziger et al. | 372/107 |
| 3,847,703 | 11/1974 | Kaiser | 372/65 |
| 4,045,129 | 8/1977 | Hamar | 372/107 |
| 4,050,037 | 9/1977 | Knowles et al. | 372/107 |
| 4,203,080 | 5/1980 | Wright et al. | 372/65 |
| 4,342,114 | 7/1982 | Luck | 372/83 |

*Primary Examiner*—William L. Sikes
*Assistant Examiner*—Robert E. Wise

[57] ABSTRACT

A gas laser is provided in which a replaceable module, comprising a plasma chamber and the associated high voltage components and circuitry, can be quickly and easily replaced by relatively unskilled personnel without any need for optical realignment. Each high voltage electrode of the plasma chamber includes a connector plate that extends through the envelope and engages a support plate of the module containing the high voltage pulse circuitry. These support plates are precisely positioned with respect to two resonator mirrors mounted permanently on a base structure, while the connector plates are precisely positioned with respect to the electrodes and windows of the plasma chamber. The positioning of the connector plates with respect to the electrodes, the windows and the optical axis is identical for each of the replaceable modules. The module is releasably positioned on a base, carrying the laser mirrors, by two or more locator pins that retain it in a precise predetermined spatial and angular position with respect to the two mirrors. The module, containing the high voltage circuitry and the plasma chamber, is readily replaced without need for optical realignment.

12 Claims, 2 Drawing Sheets

LASER SYSTEM WITH INTERCHANGEABLE MODULES AND METHOD FOR INTERCHANGING SUCH MODULES

CROSS REFERENCE TO RELATED APPLICATION

This application is a continuation-in-part of U.S. patent application Ser. No. 06/496,069 filed May 19, 1983, now abandoned, which was a continuation-in-part of Ser. No. 06/351,424 filed Feb. 2, 1982, now abandoned.

BACKGROUND OF THE INVENTION

1. Field of the Invention

This invention relates to gas lasers having a sealed plasma chamber using either pure or mixed atomic or molecular gases. More particularly, it relates to such lasers in which the sealed plasma chamber and certain associated high voltage components and circuitry may be replaced by another of the same class by relatively unskilled personnel without a need for optically realigning the system to obtain oscillation.

2. Brief Description of the Prior Art

In general, gas lasers are constructed with a plasma chamber containing a selected gas or mixture of gases, and a set of electrodes that produce a high-intensity current that excites the atoms or molecules to high energy states. A pair of optical mirrors, which may be within or external to the plasma chamber envelope, are provided to produce regeneration, hence causing laser oscillation. The mirrors, which form the resonator for the gas laser, must be aligned accurately to cause optical regeneration.

Such gas lasers have been used in many different configurations using various atomic and molecular gases. The output spectra that are available cover a wide electromagnetic spectrum extending from the far infrared into the visible and near ultraviolet and have power capabilities from a few milliwatts to the megawatt region.

The practical applications of such lasers have been limited by a number of factors. Many kinds of lasers are effectively limited to laboratory usage because they cannot be operated in a sealed off condition without an auxiliary pumping system that either intermittently or continuously replenishes the gaseous medium. In molecular gas lasers, the composition of the gaseous medium gradually changes under operating conditions caused by molecular disassociation, giving rise to the requirement for the introduction of fresh gases into the envelope as used gases are removed. The life of a laser having a sealed envelope may also be limited by gaseous reactions or decomposition within the plasma chamber, the laser amplifying medium, that deteriorates the optical quality of the windows. For the most part, only inert gas lasers, such as helium-neon, and argon, krypton and other inert gas ion lasers have been practical for operation over an extended period of time as sealed-off units.

The expense associated with the use of many lasers is a critical factor in commercial applications. For example, there are helium-neon lasers which can be manufactured at relatively low cost and which are capable of operation under sealed conditions for a relatively long period of time. When the plasma chamber in such a laser finally fails, it may be more practical and economical to discard the entire unit rather than to replace the plasma chamber and realign the optical resonator to obtain oscillation.

In certain higher power and more expensive sealed inert gas lasers, the costs of the plasma chamber and the auxiliary equipment are high. When failure occurs in these more expensive laser systems, the plasma chamber is usually replaced, but that replacement requires skilled personnel because of the high voltages involved and the need for precise optical realignment. Nevertheless, such sealed inert-gas lasers are used commercially because the operating life is sufficiently long to justify the cost of replacement of the plasma chamber.

That is not true of molecular and most other gas lasers which have a more limited life under sealed operating conditions. For example, in lasers using carbon dioxide, excitation of the plasma causes disassociation of the gas molecules into carbon monoxide and oxygen. Such lasers are provided with a pumping station and the necessary auxiliary equipment to allow operation with a continuous gas flow. Recent developments in the use of catalysts to regenerate the carbon dioxide have lengthened the life of such sealed lasers, but most commercial units still require a flow of make-up gas to achieve acceptable operating life.

Similar and more serious problems arise with gas lasers using halides, for such gases are corrosive and surface reactions reduce the effectiveness of the optical windows. The resulting short life requires that these lasers also be provided with continuing gas replenishment and, in addition, means must be provided for collecting the corrosive used gases.

The commercial application of many kinds of prior art lasers requiring replenishment of the used gas in the plasma chamber generally require a bulky gas handling system.

The capability of quick and easy replacement of the plasma chamber and its associated high voltage components without the need for skilled personnel is an important commercial advantage that was not available prior to this invention.

Replaceable plasma chambers are known, but generally suffer from the difficulty of the requirement for optical realignment when the plasms chamber is replaced. U.S. Pat. No. 4,342,114 to Luck describes a laser in which the mirrors are formed as an integral part of the plasma chamber and the entire unit arranged so that it can be replaced. However, this arrangement, while eliminating the need for optical realignment at the time of installation, does not permit replacing the high-voltage components as an integral unit with the plasma chamber and also requires the replacement of the amplifier mirrors because they are an integral part of the plasma chamber. However, mirrors have a long life and do not need replacement, whereas the high voltage components, including the high voltage switch, typically have a shorter life and are desirably replaced along with the plasma chamber.

SUMMARY OF THE INVENTION

In accordance with the present invention a gas laser is provided in which the plasma chamber and the associated high-voltage circuits can be quickly and easily replaced by relatively unskilled personnel. This feature makes it possible to use sealed plasma chambers in cases where the sealed chamber has a long shelf life, but gradual deterioration occurs when the plasma chamber is operated to obtain laser operation. In many applications such lasers are operated only intermittently. With the elimination of the gas handling system, it becomes possible to manufacture a compact, and in some important cases, portable and light weight lasers. This invention is addressed to gas lasers operating a low to medium power output and is not broadly applicable to very high energy lasers.

The sealed plasma chamber includes the usual high voltage electrodes and optical windows. To make chamber replacement possible without need for elaborate optical realignment, one section of a mating mechanical coupler is secured to the envelope or directly to one of the high voltage electrodes of the demountable plasma chamber and is positioned in a predetermined spatial and angular position with respect to the electrodes, optical windows and the optical axis of the plasma chamber. The positioning of the mechanical coupler with respect to the electrodes, the windows and the optical axis is identical for each of the interchangeable plasma chambers. A separate base on which the resonator mirrors are mounted, and which may carry the electrical elements making connection to the electrodes, the power supply and auxiliary equipment, is provided with the other section of the mating coupler fixed in a precise predetermined spatial and angular position with respect to a pair of mirrors mounted on the base. The position of this section of the mechanical coupler with respect to the mirrors is identical for each of the interchangeable bases. Each base and each plasma chamber is thus interchangeable with any other similarly aligned unit. When a plasma chamber fails, it is easily replaced by merely disconnecting the old chamber from the base and inserting the replacement. The predetermined positions of the two coupler sections, one with respect to the electrodes and optical axis of the plasma chamber and the other with respect to the two mirrors, precisely locates the replacement chamber in position with sufficient accuracy to produce laser oscillations without elaborate adjustment. In important cases, the sealed plasma chamber containing an optimum laser gas mixture can be manufactured at low cost. This feature makes it possible to discard the used chamber and conveniently replace it with another one. More expensive chambers, such as in molecular lasers using rare isotopic species or those requiring elaborate electrode configuration, can be returned to the factory for reconditioning while the replacement chamber is in service.

This ability to replace a sealed plasma chamber, together with certain high voltage components, while retaining the mirrors, power supply and auxiliary equipment, makes it feasible to use lasers in many applications where cost restrictions or conditions of use now rule out their application. Advantage is taken here of the fact that plasma chambers of the types that have a relatively short life under actual operating conditions, may have a satisfactorily long shelf life in an inactive condition. Thus, even these so-called short-lived plasma chambers become feasible for use in many non-laboratory applications.

The invention also permits different plasma chambers containing different gases but belonging to the same class of lasers to be used with a common base, thus providing greater versatility of application at minimum cost.

An important objective of the invention is to provide a compact portable source of short duration laser pulses of relatively high peak intensity. The necessary high speed electrical excitation of the laser plasma is provided by energy storage capacitors and a high speed electrical switch. The stored electrical energy in the capacitors is transferred at a high speed, i.e. a rapid current rise, to the laser plasma by the switch, which is in the form of a triggered or untriggered gas filled element. The energy efficient generation of such short duration high intensity output pulses by lasers using gases in which the molecules in the upper levels are short lived, requires very high speed energy transfer to the plasma chamber. If the lifetime is about a few nanoseconds, the rise time of the current excitation in the plasma must be less than a few nanoseconds.

In the embodiment described here, the small plasma chamber is integrated with the energy storage capacitors and the switch in a single small module to accomodate the need high speed electrical excitation. In this module, the energy storage capacitors and the switch are positioned immediately adjacent the plasma chamber, permitting the connection to the electrodes of the plasma chamber to be made by at a low inductance. This arrangement results in the required high speed excitation for the production of high intensity short pulses.

This module is replaceable in the laser resonator so that in the event of failure of any component in the module, the laser can be quickly and easily returned to service, by relatively unskilled personnel, merely by replacing the entire module with another. If such a module were not provided, the plasma chamber and the associated circuits would have to be permanently installed as discrete closely packed components. Replacement of the plasma chamber or a high voltage component would be difficult and would require skilled personnel.

Candidates for such modular plasma construction include gas lasers with moderately high gain and short lived excited state molecules in which minimum inductance and high speed electrical excitation are requirements. Such lasers will operate in the transient gain switched mode when excited at high speed. A resonator of short length makes possible efficient energy extraction in the short duration of the transient gain. This small size of the plasma chamber is consistent with the requirement for an overall low inductance circuit. The short duration excitation pulse made possible by the modular plasma chamber construction has efficiently generated high peak intensities obtained from a small laser plasma at very low energy. The construction just described permits efficient gain switched operation in lasers using gases in which the upper-level lifetime of the molecules is very short.

In the preferred embodiment of the invention in a pulsed gas laser, the plasma chamber together with other electrical components with inherently short lives, such as the energy deposition capacitors and the energy deposition switch, are integrated in a single disposable "plug-in" modules. The entire module is postioned by a coupler at a pre-determined postion with respect to the axis of the plasma chamber. When the module is inserted into the resonator, a mate to the coupler locks the plasma chamber in a predetermined aligned position with respect to the resonator axis. The integrated module is arranged to provide sufficiently low inductance to produce plasma pulses having a duration of less than two nanoseconds.

Figure 1:
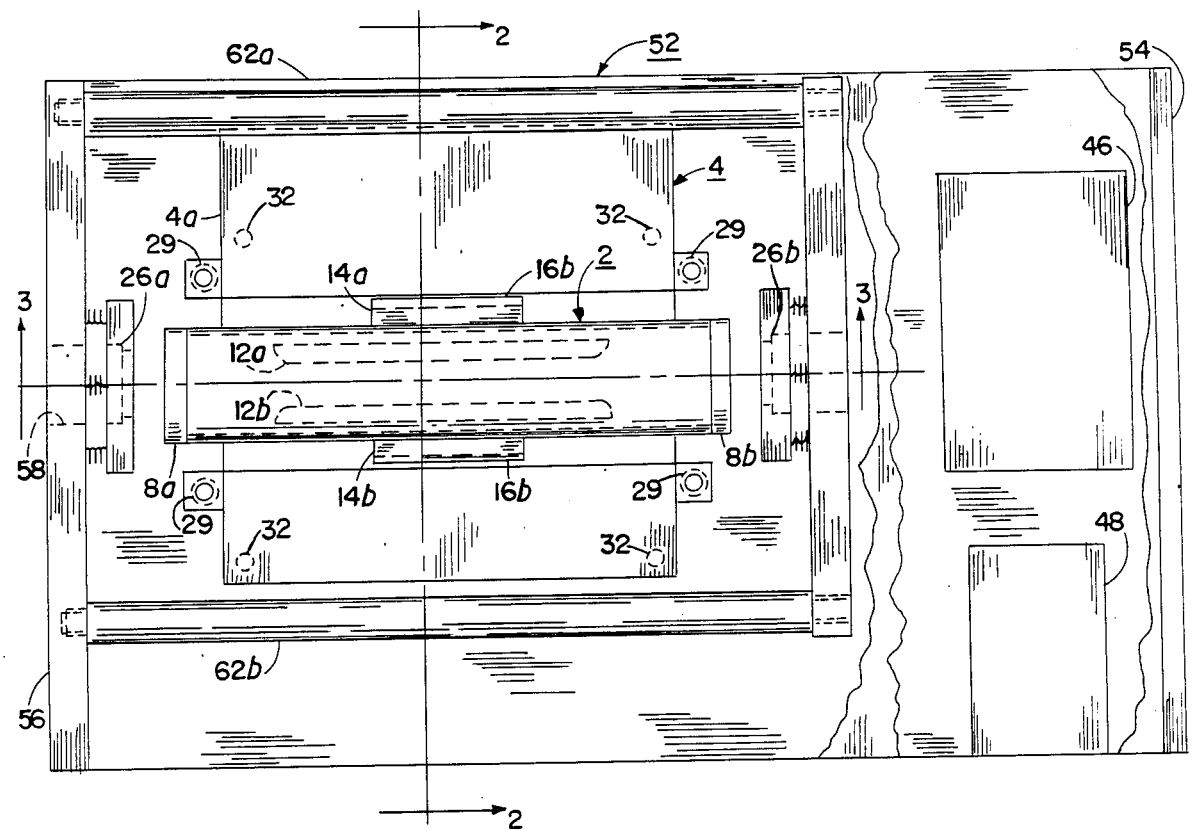
FIG. 1 is a diagrammatic plan view of a laser system incorporating the invention.
Figure 2:
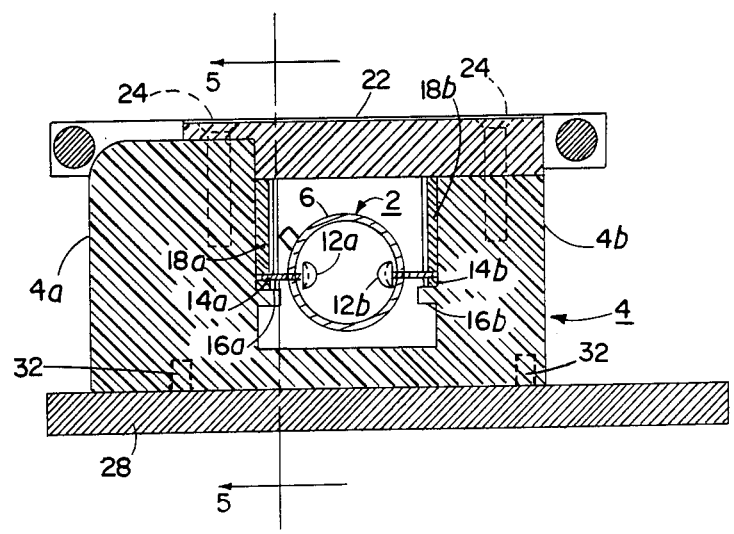
FIG. 2 is a sectional view along line 2—2 of FIG. 1.
Figure 3:
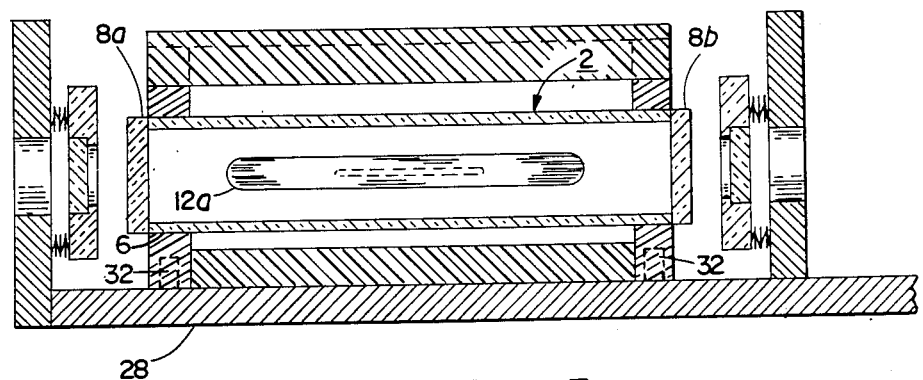
FIG. 3 is a longitudinal sectional view along line 3—3 of FIG. 1.

In the diagrammatic view of FIG. 1, a plasma chamber, generally indicated at 2, is positioned between two sections 4a and 4b of a replaceable module, generally indicated at 4 (FIG. 2). The plasma chamber 2 comprises an envelope having a tubular ceramic portion 6 sealed at its ends by two quartz windows 8a and 8b. Extending longitudinally within the plasma chamber 2 are a pair of oppositely disposed high-voltage electrodes 12a and 12b. A pair of electrode connector plates 14a and 14b are formed integrally with the electrodes 12a and 12b respectively and extend through opposing sides of the plasma chamber envelope.

The plasma chamber 2 is permanently sealed and filled with nitrogen gas and may be of the general type described in the co-pending U.S. patent application of James C. Hsia entitled LASER PLASMA CHAMBER filed on May 19, 1983, Ser. No. 06/496,068, assigned to the same assignee as the present application.

The connector plates 14a and 14b serve both to support the plasma chamber 2 and to make connection to the electrodes 12a and 12b. For this reason and also to minimize inductance, the connector plates are of sturdy dimensions and preferably are at least one-third as long as the electrodes to which they are secured. These connector plates 14a and 14b respectively make face-to-face contact with two plasma chamber support plates 16a and 16b. These support plates, which are equal in length to the connector plates, provide the electrical connection to the plasma chamber and also form a precision mounting for the plasma chamber.

Figure 5:
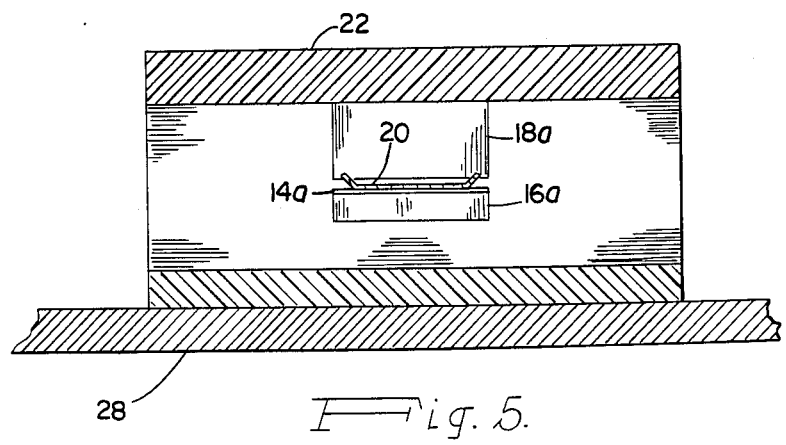
FIG. 5 is a side view of the plasma chamber showing one of the electrode connectors and the corresponding chamber lock member.

To maintain the lower surfaces of the connector plates 14a and 14b in firm engagement with the upper faces of the supports 16a and 16b, two plasma chamber lock plates 18a and 18b are arranged to exert a downward force on the two connector plates 14a and 14b to maintain them in firm pressure contact with the support plates 16a and 16b. Each of the chamber lock plates 18a and 18b carries on its bottom surface a leaf spring 20 that bears directly on the upper surface of the support plate immediately under it as best illustrated by FIG. 5.

The upper ends of the chamber lock plates 18a and 18b are secured to a cover plate 22 so that when the screws 24 are tightened securing the cover plate to the module sections 4a and 4b, the plasma chamber electrode connectors 14a and 14b are respectively clamped into engagement with support plates 16a and 16b. The cover plate 22, which is formed of epoxy or other suitable insulating material, has embedded therein a charging resistor and capacitor (not shown) that make connection between the electrodes 16a and 16b through the lock plates 18a and 18b, which are formed of brass or other suitable material.

As shown in FIG. 1, two resonator mirrors 26a and 26b are positioned at opposite ends of the plasma chamber 2 and function in the manner well known in the art.

The module 4 is secured by any suitable means 29 to a base plate 28, formed of aluminum or other suitable material, and is precisely positioned in the horizontal plane with respect to the base plate by four locator pins 32 that extend into corresponding bores molded into the bottom surface of the module 4.

Figure 4:
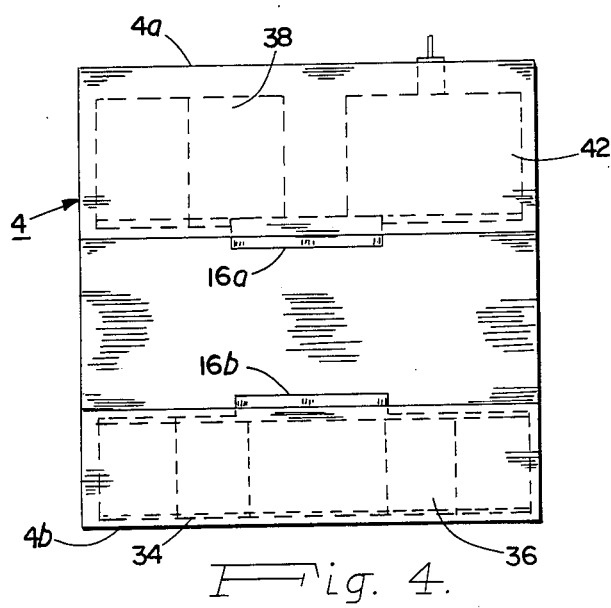
FIG. 4 is a diagrammatic top view of a replaceable module showing the position of the high voltage components.

The module 4 contains three high-voltage capacitors 34, 36 and 38 and a gas switch 42, indicated diagrammatically in FIG. 4, connected in a Blumlein circuit in the well known manner to produce, through the connections made by the support plates 16a and 16b, high voltage pulse discharges between the electrodes 12a and 12b.

These high voltage components are potted in heat conductive epoxy to produce the rigid block module 4. The bores that receive the four locator pins 32 are formed in the mold and so are precisely positioned from module-to-module with respect to the horizontal positions of the plasma chamber supports 16a and 16b.

A conventional high-voltage power supply 46 and timing and trigger circuits 48 are connected by suitable leads (not shown) to the module 4. The entire unit is housed in a case, generally indicated at 52, which includes a control panel 54 and a rear panel 56. The rear panel 56 has an opening 58 through which the laser light is emitted.

The two mirrors 26a and 26b are mounted, for example by the resonator tie rods 62a and 62b, in precise positions with respect to the locator pins 32 and, therefore, with respect to the horizontal positions of the plasma chamber support plates 16a and 16b. Thus, if the module 4 is removed and another module substituted, the exact lateral dimensional relationship of the two resonator mirrors 26a and 26b is maintained with respect to the two support plates 16a and 16b.

The upper surfaces of the support plates 16a and 16b, which determine the positions of the electrodes 12a and 12b of the plasma chamber 2, are maintained at a precise height above the base plate 28 by the molding process when the module 4 is formed. There may be, however, from module to module, small variations in this dimension because of variations in the molding process. These variations are eliminated by machining the upper surface of each support plate 16a and 16b after the module is completed to maintain the same precise vertical position of each chamber with respect to the base plate 28.

With the arrangement described, either the module 4 or the plasma chamber 2 can be replaced quickly and easily by relatively unskilled personnel. In the event of failure of one of the high-voltage components, the module 4 is removed by lifting the cover plate 22, after removing the screws 24, and lifting the plasma chamber 2 from the support plates 16a and 16b. The high voltage power leads (not shown) are then disconnected from the module 4 and the module lifted off the locator pins 32. A replacement module is then positioned on the locator pins 32 and connected to the high voltage supply. The plasma chamber is replaced on the support plates 16a and 16b and clamped in position by the cover plate 22. When power is restored, the laser will operate immediately without need for complex optical realignment.

The two plasma chamber windows 8a and 8b are coated to minimize reflections at the operating frequency of the laser, as is well known. The two connector plates 14a and 14b will not need to fit snugly between the walls of the two module sections 4a and 4b because the non-reflective coated windows 8a and 8b will allow the laser to continue to oscillate despite small variations in the horizontal angular position of the plasma chamber 2.

Note that in this embodiment, the plasma chamber 2 is supported and its position controlled by the electrode connector plates 14a and 14b that are secured to the envelope adjacent the electrodes 12a and 12b. This arrangement permits greater flexibility than if the position of the plasma chamber were determined by mounts affixed to another part of the envelope. The critical element in maintaining the oscillation is the position of the electrodes 12a and 12b, which together with the resonator mirrors 26a and 26b define the optical axis of the chamber, not the position of the tubular part of the envelope. Thus, by forming each electrode connector plate integrally with the associated electrode, or otherwise attaching it so that dimensional integrity is maintained, the other dimensions of the plasma chamber envelope do not need to be so precisely controlled.

In general it is preferred to mount the resonator mirrors externally of the plasma chamber so that replacement of the plasma chamber does not require replacement of the mirrors. However, for some applications, it may be preferable to mount one of the mirrors within the envelope and the other externally as already described.

I claim:

1. A module for cooperation with components mounted on a base to provide a laser system of the type having a sealed plasma chamber, a power supply, and high-voltage pulse generating circuitry including as active components an energy storage capacitor adapted to store energy from the power supply and a high-voltage switch adapted to apply high-voltage pulses of the capacitor energy to said plasma chamber, the base carrying the power supply and at least one mirror of an optical resonator of the lase system, said module comprising (a) said plasma chamber, the plasma chamber comprising an envelope having an optical window, and first and second high-voltage electrodes disposed within the envelope, (b) at least one of said active components of said high-voltage pulse generating circuitry, and (c) reference means having a predetermined spatial relationship and orientation with respect to said electrodes and said window, and being adapted to cooperate with reference means on said base having a predetermined spatial relationship and orientation with respect to said mirror, to position said plasma chamber with respect to said base and mirror and allow said module to be removed from said base and replaced on said base by a like module.

2. The module of claim 1 wherein said at least one of said active components of said high voltage pulse generating circuitry is potted in a module housing in which said chamber is mounted.

3. The module of claim 1 wherein said energy storage capacitor and high voltage switch are both disposed in said module.

4. A laser system comprising (a) a power supply, (b) a sealed plasma chamber having
an envelope,
first and second high-voltage electrodes positioned within said envelope, and at least one optical window in said envelope, (c) a replaceable module including
said plasma chamber,
high-voltage pulse-generating circuitry including an energy storage capacitor and a high voltage switch positioned adjacent said plasma chamber, said capacitor being adapted to store energy from the power supply and said switch being adapted to repeatedly discharge said capacitor to apply high voltage pulses to said electrodes, and
horizontal and vertical reference means having a predetermined spatial relationship and orientation with respect to said electrodes and said window, and (d) a base for said replaceable module including
said power supply,
at least one mirror having a reflective surface mounted on said base, and
horizontal and vertical reference means supported by said base and having a predetermined spatial relationship and orientation with respect to said mirror surface,
said horizontal and vertical reference means of said module and said horizontal and vertical reference means of said base being cooperatively arranged to be secured together to position said mirror surface and said plasma chamber in position to permit laser oscillations,
whereby said module may be removed from said base and replaced on said base by a like module without need for substantial optical realignment.

5. A laser system as claimed in claim 4 including two of said optical windows in said envelope, and two of said mirrors mounted on said base.

6. A laser system as claimed in claim 4 including
a pair of connector plates each connected integrally with one of said electrodes and extending through opposite sides of said plasma chamber, and
a pair of plasma chamber support plates in said module, each in face-to-face engagement with one of said connector plates.

7. A laser system as claimed in claim 6 wherein
each of said connector plates is at least one-third as long as the electrode to which it is connected.

8. A laser system comprising (a) a base including a power supply and a mirror, (b) a sealed plasma chamber having
an envelope,
first and second electrodes, and
first and second electrode connector means connected respectively to said first and second electrodes and extending outwardly through said envelope, and (c) a module for use with the power supply and mirror on said base, said module being replaceable on said base with a like module, said module comprising
said plasma chamber,
high voltage circuitry including an energy storage capacitor and a high voltage switch, said capacitor being adapted to store energy from the power supply and said switch being adapted to repeatedly discharge said capacitor to produce high voltage pulses for said plasma chamber,
first and second support means electrically connected to said capacitor, and
spring means arranged to maintain pressurized contact between first and second electrode connector means and said first and second support means respectively to couple the high voltage pulses from said capacitor to said plasma chamber.

9. A module for use with a base that carries an optical resonator and power supply, the module being adapted to be removed from the optical resonator on the base and comprising
   (a) first and second sections with facing spaced opposing walls,
   (b) an energy storage capacitor disposed within at least one of said sections for storing energy from the power supply,
   (c) a high voltage switch disposed within one of said sections for discharging said capacitor in response to a control signal,
   (d) a sealed plasma chamber positioned between said sections and immediately adjacent said opposing walls, and
   (e) connection means extending from said first and second walls and arranged to make low inductance contact between the capacitor and said plasma chamber to apply the energy discharged from said capacitor to said plasma chamber as a high voltage pulse.

10. In a gas laser system, a method comprising the steps of
    (a) providing a base including a power supply and mounting at least one mirror surface on said base,
    (b) providing a sealed plasma chamber having a pair of high voltage electrodes and at least one optical window,
    (c) sealing said plasma chamber within a replaceable module having high-voltage pulse-generating circuitry including a capacitor for storing energy from the power supply and a switch for discharging said capacitor to produce a high voltage pulse for said chamber,
    (d) securing horizontal and vertical reference means to said module in a predetermined spatial relationship and orientation with respect to said optical window and said electrodes, and
    (e) supporting by said base, in predetermined fixed spatial relationship and orientation with respect to said mirror surface, horizontal and vertical reference means for releasably receiving and and being secured to said horizontal and vertical reference means of said module,
    said horizontal and vertical reference means of said module and said horizontal and vertical reference means of said base being positioned so that when secured together said plasma chamber and said mirror surface are in substantial optical alignment so that said laser system is capable of laser oscillations without need for substantial optical realignment.

11. In a gas laser system, a method comprising the steps of
    (a) providing a supporting base having thereon at least one adjustable mirror surface and a horizontal and vertical reference means,
    (b) adjusting said mirror surface to a first predetermined spatial and angular position with respect to said horizontal and vertical reference means,
    (c) securing said mirror surface in said first predetermined position,
    (d) providing a plurality of sealed plasma chambers of the same class, each having a pair of high voltage electrodes and at least on optical window and sealed within a replaceable module, each containing high-voltage pulse-generating circuitry including a capacitor for storing energy from a power supply and a switch for discharging said capacitor to produce a high voltage pulse for said plasma chamber, and
    (e) securing to each of said modules horizontal and vertical reference means capable of being interchangeably secured to said horizontal and vertical reference means of said base,
    said horizontal and vertical reference means of each of said modules bearing a second predetermined spatial and angular position with respect to said optical window and electrodes of the plasma chamber to which it is secured,
    the first predetermined position of said horizontal and vertical reference means of said base and the said second predetermined position of said horizontal and vertical means of each of said modules being such that when said horizontal and vertical reference means of said base is secured to the horizontal and vertical reference means of one of said modules, the plasma chamber of said module is in substantial optical alignment with said mirror surface and said laser is capable of laser oscillations without need for substantial optical realignment.

12. In a gas laser system, a method comprising the steps of
    (a) providing a sealed plasma chamber having first and second high voltage electrodes and first and second electrode connector plates connected respectively to said first and second electrodes and extending outwardly through the walls of said plasma chamber,
    (b) providing a replaceable module including said plasma chamber, high voltage pulse circuitry comprising an energy storage capacitor and a switch for discharging said capacitor, and first and second support members connected to said energy storage capacitor,
    (c) providing an optical resonator comprising a pair of spaced resonator mirrors, and
    (d) releasably securing said module within said optical resonator in a predetermined position relative to said mirrors.

* * * * *

UNITED STATES PATENT AND TRADEMARK OFFICE
CERTIFICATE OF CORRECTION

PATENT NO. : 4,774,714
DATED : September 27, 1988
INVENTOR(S) : Ali Javan

It is certified that error appears in the above-identified patent and that said Letters Patent is hereby corrected as shown below:

Col. 2, line 43, "plasms" should be --plasma--;

Col. 3, line 4, "a low" should be --at low--;

Col. 4, line 16, "need" should be --needed--;

Col. 4, line 60, "postioned" should be --positioned--;

Col. 4, line 61, "postion" should be --position--;

Col. 7, line 37, Claim 1, "lase" should be --laser--;

Col. 8, line 66, Claim 8, after "between" insert --said--;

Col. 10, Claim 11, line 11, "on optical" should be --one optical--.

Signed and Sealed this

Fourteenth Day of February, 1989

*Attest:*

DONALD J. QUIGG

*Attesting Officer*  *Commissioner of Patents and Trademarks*